(12) United States Patent
Chao

(10) Patent No.: US 6,854,752 B2
(45) Date of Patent: Feb. 15, 2005

(54) DETACHABLE BICYCLE

(76) Inventor: Hung-Chang Chao, 6F, No. 21, Alley 29, Lane 372, Section 5, Chung-Shiao East Road, Taipei (TW)

( * ) Notice: Subject to any disclaimer, the term of this patent is extended or adjusted under 35 U.S.C. 154(b) by 0 days.

(21) Appl. No.: 10/713,020

(22) Filed: Nov. 17, 2003

(65) Prior Publication Data
US 2004/0094932 A1 May 20, 2004

(30) Foreign Application Priority Data
Nov. 20, 2002 (TW) ...................................... 91218683 U

(51) Int. Cl.$^7$ ................................................. B62K 1/00
(52) U.S. Cl. ....................................... 280/278; 280/287
(58) Field of Search ................................ 280/287, 278, 280/638, 87.05

(56) References Cited

U.S. PATENT DOCUMENTS

| | | | | |
|---|---|---|---|---|
| 2,993,709 A | * | 7/1961 | Wick | ........................... 280/287 |
| 3,215,459 A | * | 11/1965 | Baldwin | ....................... 403/13 |
| 3,658,354 A | * | 4/1972 | Read | ......................... 280/7.15 |
| 5,607,171 A | * | 3/1997 | Labranche | ............... 280/288.1 |
| 6,712,375 B2 | * | 3/2004 | Chao | .......................... 280/287 |

* cited by examiner

Primary Examiner—Daniel G. DePumpo
(74) Attorney, Agent, or Firm—Bacon & Thomas PLLC

(57) ABSTRACT

A detachable bicycle is disclosed. The bicycle comprises a front frame section including a first crossbar, a rear frame section including a second crossbar having second fastening structure for matingly coupling to first fastening structure of the first crossbar when a rear open end of the first crossbar is inserted into the second crossbar, and a fastening mechanism including two ring fasteners. Each ring fastener is operative to fasten front and rear ends of the second crossbar on the open end of the first crossbar. An adverse effect caused by different forces exerted on the frame sections when a drives propels the bicycle by means of pedals can be substantially eliminated by the invention.

6 Claims, 6 Drawing Sheets

DETACHABLE BICYCLE

BACKGROUND OF THE INVENTION

1. Field of the Invention

The present invention relates to bicycles and more particularly to a bicycle featured a detachable frame with improved characteristics.

2. Description of the Prior Art

Conventionally, bicycles can be classified as ones featured a fixed frame and ones featured a foldable frame (e.g., folding bicycles). For the former, head tube, fork, crossbar, down tube, seat tube, and seat stay thereof are welded together. Thus, they are superior in a strong structure and less restrictions imposed on designs. For example, bicycles featured a popular rhombic frame are made possible. But they are also inferior for occupying space in delivery and/or storage. This is particularly true for electric bicycles having longer length and being heavier. Nowadays, many cars have a rack for fastening a bicycle on the top or the rear of the car so that a driver can carry the bicycle while going for an outing. However, the fastening process is tedious. Further, it may adversely affect safety while driving.

For the latter (i.e., folding bicycles), a hinge mechanism is provided in an intermediate portion thereof so that a folding is made possible thereat. They are superior in saving space in delivery and/or storage. They are particularly suitable for being carried by cars for outings. But they are also inferior for being structurally weak because a potential break may occur at the folded portions of the bicycle. For overcoming such problem, reinforcement is added at the folded portions. Unfortunately, such reinforcement may detract the bicycle's appearance because many restrictions may be imposed on the design of bicycle due to the provision of the hinge mechanism. As a result, only a few types of folding bicycles are popular in the market. Further, some folding bicycles even have an increased width after folded. This can compromise the desired purpose of saving space in delivery and/or storage. Hence, a need for improvement exists.

SUMMARY OF THE INVENTION

It is an object of the present invention to provide a detachable bicycle which can be quickly detached into at least two portions or assembled together without using any tools.

It is another object of the present invention to provide a detachable bicycle in which detached components thereof can be either stored separately for ease of transportation or tightly packed together in the trunk of a car for saving storage space while going for an outing by driving the car.

It is still another object of the present invention to provide a detachable bicycle having an enhanced structural strength as compared with a relatively weak detachable bicycle of the prior art.

It is yet another object of the present invention to provide a detachable bicycle having the advantage of being structurally simple by providing only a single device for quickly either assembling or disassembling the bicycle. The detachable bicycle of the present invention has the additional advantages of being more lightweight, having a further reduced size after being detached, and being ease of delivery.

To achieve the above and other objects, the present invention provide a detachable bicycle comprising a front frame section including a head tube, a fork, handlebars, a handle tube interconnected the handlebars and the head tube, a front wheel, and a first crossbar having a rear open end and first fastening means; a rear frame section including a bottom bracket, a pair of pedals coupled to the bottom bracket, a sprocket wheel coupled to the bottom bracket, a rear wheel, a chain stay extended rearward from the bottom bracket to an axle of the rear wheel, and a seat tube extended upwardly the bottom bracket, a seat stay having a rear end coupled to the axle of the rear wheel, a seat post inserted into the seat tube, the seat post having a top saddle, a quick release at a top opening of the seat tube, the quick release being adapted to secure the seat post and the seat tube together, a second crossbar for receiving the open end of the first crossbar, the second crossbar having second fastening means for matingly coupling to the first fastening means when the open end of the first crossbar is inserted into the second crossbar, an oblique down tube interconnected the second crossbar and the bottom bracket, and an oblique connecting tube interconnected the second crossbar and the seat tube; and a fastening mechanism including a first ring fastener and a second ring fastener, wherein each of the ring fasteners is operative to fasten a front end and a rear end of the second crossbar on the open end of the first crossbar. By utilizing the present invention, an adverse effect caused by different forces exerted on the frame sections when a drives propels the bicycle by means of the pedals can be substantially eliminated.

BRIEF DESCRIPTION OF THE DRAWINGS

The drawings disclose an illustrative embodiment of the present invention which serves to exemplify the various advantages and objects hereof, and are as follow.

DETAILED DESCRIPTION OF THE PREFERRED EMBODIMENTS

Figure 1:
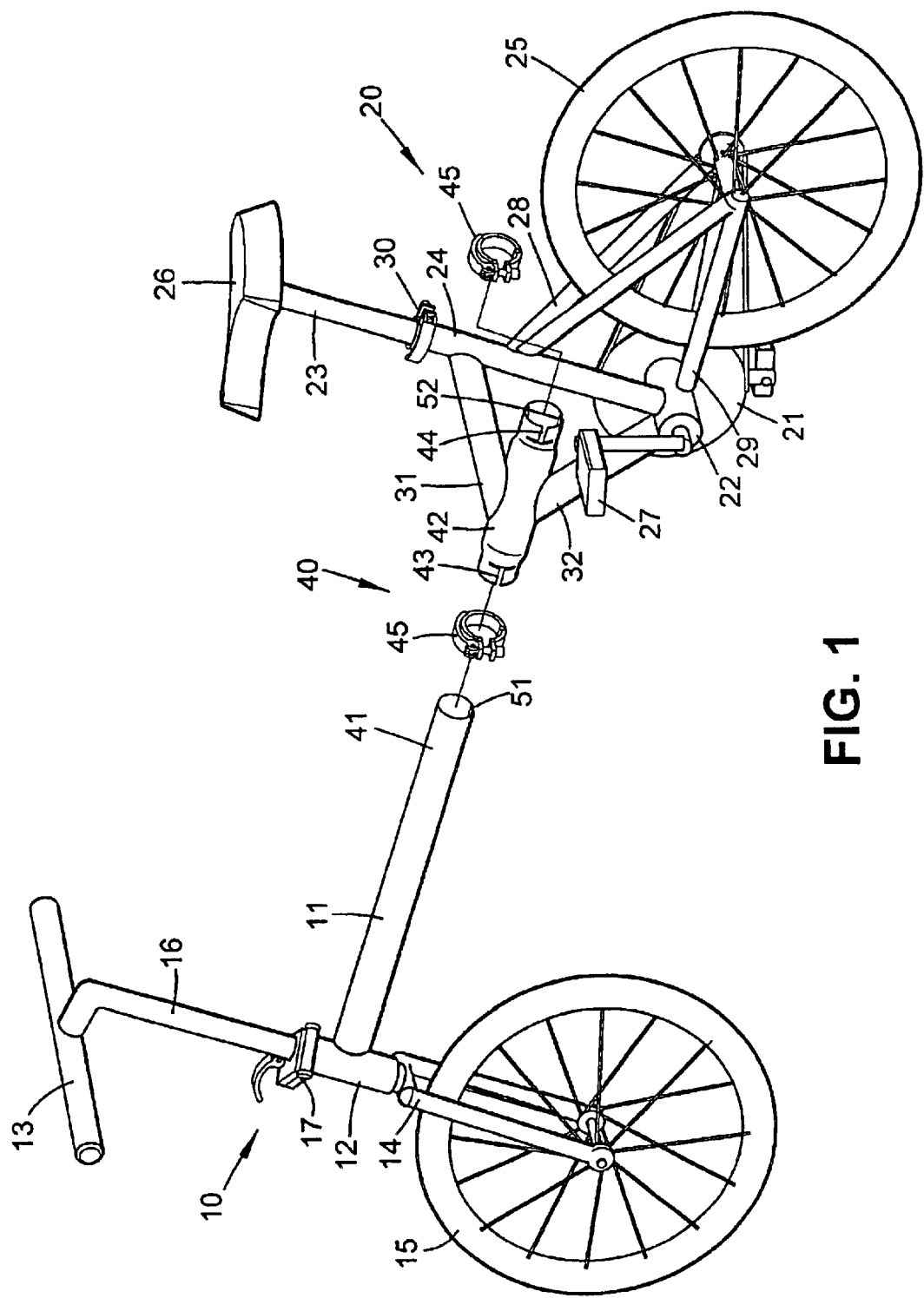
FIG. 1 is an exploded perspective view of a preferred embodiment of detachable bicycle according to the invention.
Figure 2:
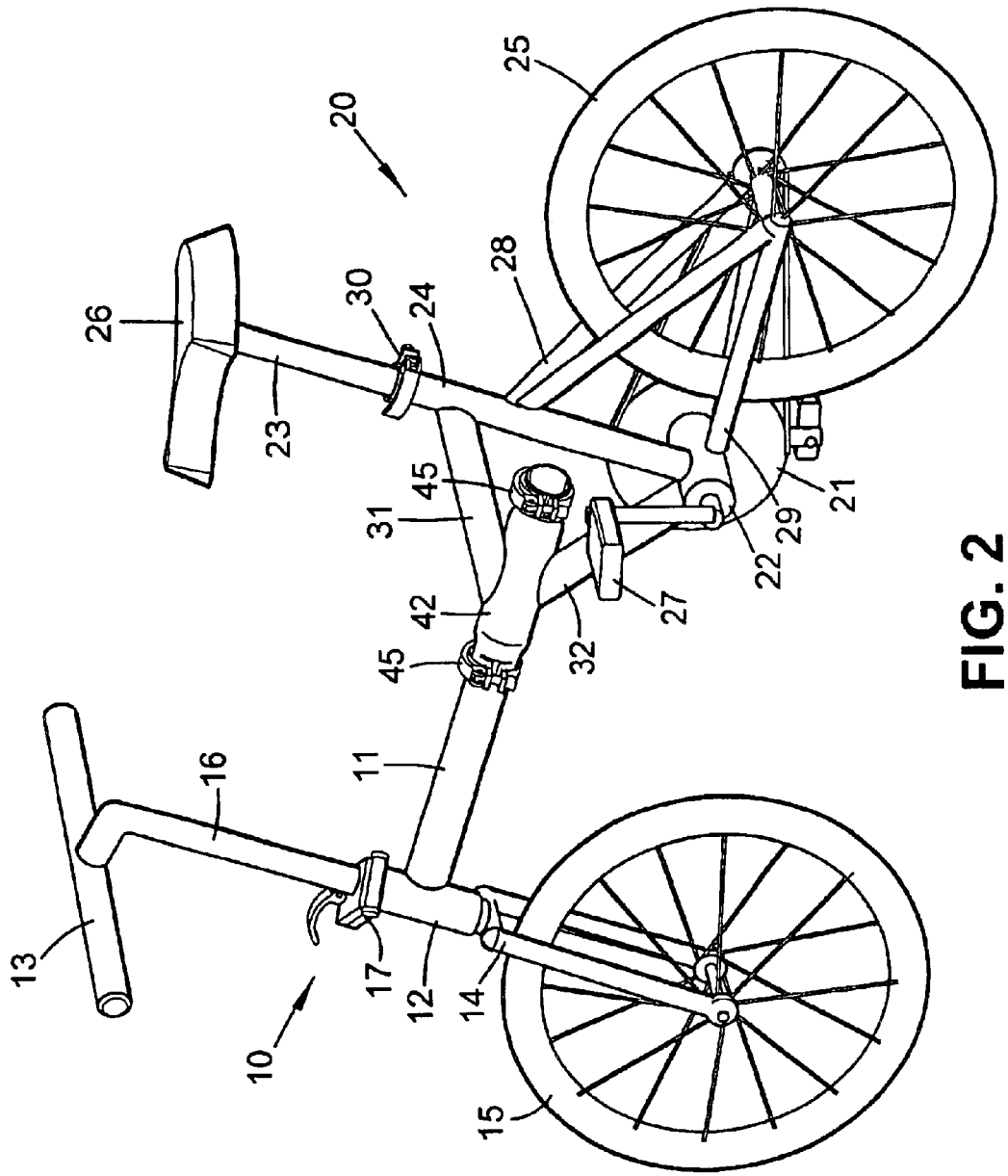
FIG. 2 is a perspective view of the assembled bicycle.
Figure 3:
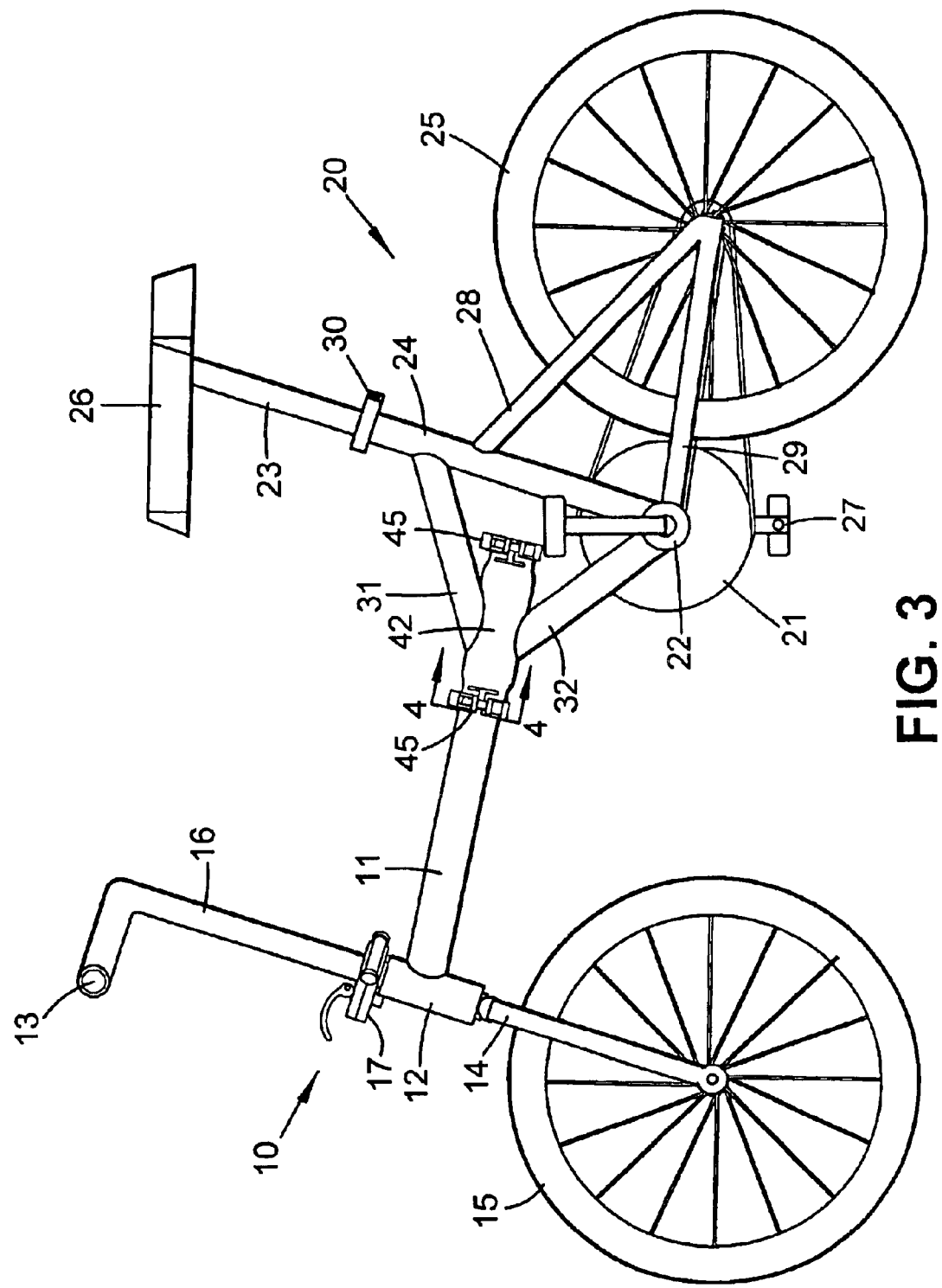
FIG. 3 is a side view of the bicycle shown in FIG. 2.

Referring to FIGS. 1, 2 and 3, there is shown a detachable bicycle constructed in accordance with the invention. The bicycle a front frame section 10 and a rear frame section 20. A fastening mechanism 40 is provided to secure the frame sections 10 and 20 together as detailed later.

The front frame section comprises a head tube 12, a fork 14, handlebars 13, a handle tube 16 interconnected the handlebars 13 and the head tube 12, a front wheel 15 releasably coupled to the fork 14 by mean of a well known quick release, a hinge 17 at the joining portion of the head tube 12 and the handle tube 16 so that the handle tube 16 is adapted to fold downward from the hinge 17 (see FIG. 6), and a first crossbar 11 having a rear open end 41 as part of the fastening mechanism 40. In the embodiment the cross-section of the first crossbar 11 is circle, while it is appreciated by those skilled in the art that the cross-section of the first crossbar 11 may be any of other shapes such as oval or rectangle without departing from the scope and spirit of the invention.

The rear frame section 20 comprises a bottom bracket 22, a pair of pedals 27 coupled to the bottom bracket 22, a sprocket wheel 21 coupled to the bottom bracket 22, a rear wheel 25, a chain stay 29 extended rearward from the bottom bracket 22 to an axle of the rear wheel 25, and a seat tube 24 extended upwardly the bottom bracket 22, a seat stay 28 having a rear end coupled to the axle of the rear wheel 25, a seat post 23 inserted into the seat tube 24, the seat post 23 having a top saddle 26, a quick release 30 at a top opening of the seat tube 24, the quick release 30 being adapted to secure the seat post 23 and the seat tube 24 together, a second crossbar 42 as part of the fastening mechanism 40 for receiving the open end 41 of the first crossbar 11 by inserting the open end 41 of the first crossbar 11 thereinto (see FIG. 2), an oblique down tube 32 interconnected the second crossbar 42 and the bottom bracket 22, and an oblique connecting tube 31 interconnected the second crossbar 42 and the seat tube 24.

Figure 4:
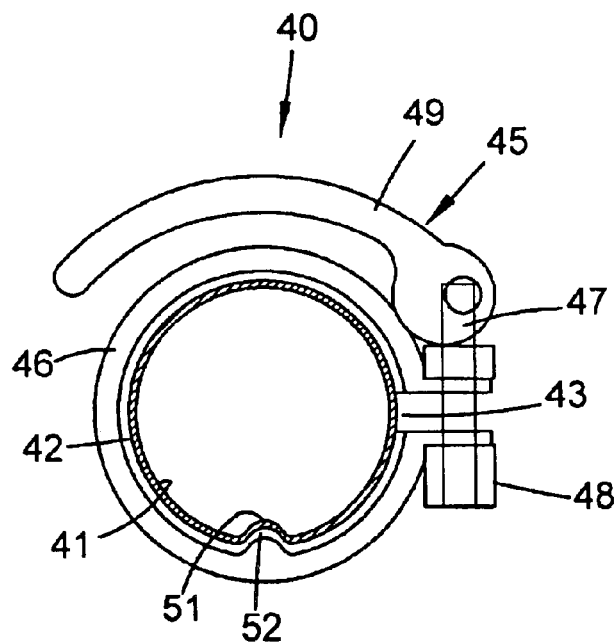
FIG. 4 is a cross-sectional view taken along line 4—4 of FIG. 3, where means for fastening the first crossbar and the second crossbar is illustrated.
Figure 5:
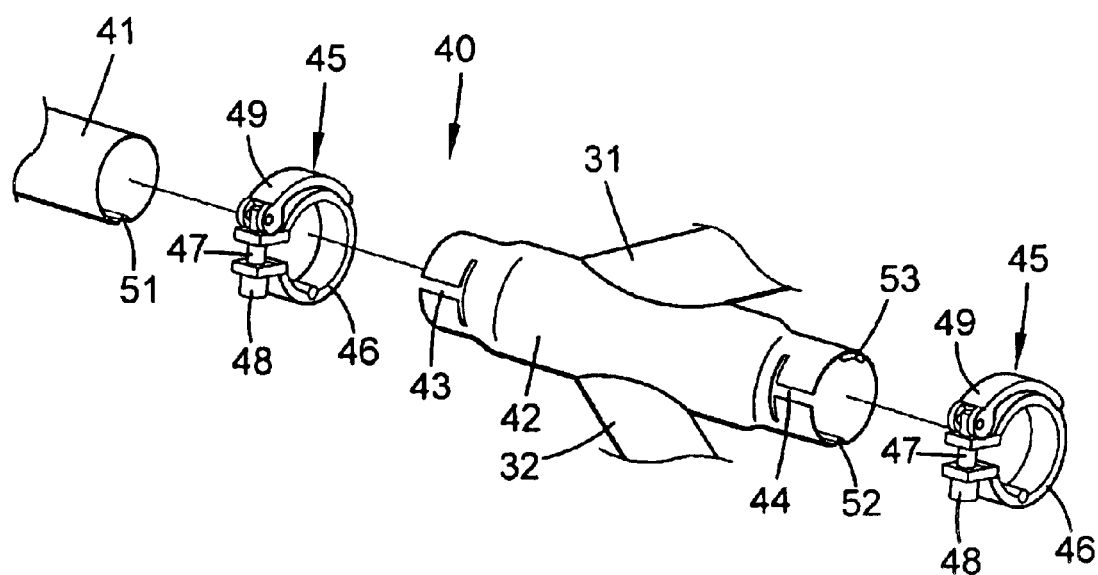
FIG. 5 is an exploded view of the detached portion in the crossbar of the bicycle.

Referring to FIGS. 4 and 5, the crossbars 11 and 42 are aligned. Also, an intermediate portion (i.e., the portion coupled to the connecting tube 31 and the down tube 32) of the second crossbar 42 is enlarged (i.e., diameter increased) so as to reduce stress and reduce friction while inserting the first crossbar 11 in the second crossbar 42. The second crossbar 42 has a front T-shaped gap 43 and a rear T-shaped gap 44. The second crossbar 42 and the inserted open end 41 of the first crossbar 11 are secured together by fastening a pair of ring fasteners 45 at the front T-shaped gap 43 and the rear T-shaped gap 44 by flexibly deforming the T-shaped gaps 43 and 44 respectively. The second crossbar 42, the ring fasteners 45 and the open end 41 are constituent components of the fastening mechanism 40.

The ring fasteners 45 are well known devices. For example, the ring fastener 45 comprises a bolt 47 and nut 48 combination, an arcuate lever 49 having a cam portion pivotably coupled to the bolt 47, and a C-shaped member 46 adapted to put on the open end 41 of the first crossbar 11. For each ring fastener 45, a user can pivot the lever 49 to fasten the C-shaped member 46 on the open end 41 of the first crossbar 11. A reverse pivoting of the levers 49 can unfasten the first crossbar 11 quickly.

Different forces may be exerted on the front frame section 10 and the rear frame section 20 respectively when a drives propels the bicycle by means of the pedals 27. Advantageously, the provision of the fastening mechanism 40 can eliminate an adverse effect caused by the undesired different forces. In detail, a lengthwise first groove 51 is provided on the first crossbar 11 and two lengthwise second grooves 52 are provided on the front and rear ends of the second crossbar 42 respectively. The first groove 51 is tightly rested on the second grooves 52 when the open end 41 of the first crossbar 11 is inserted into the second crossbar 42 so as to prevent the open end 41 from rotating about the second crossbar 42. In the embodiment the cross-section of each of the open end 41 and the second crossbar 42 is circle, while it is appreciated by those skilled in the art that the cross-section of each of the open end 41 and the second crossbar 42 may be any of other shapes such as oval or rectangle without departing from the scope and spirit of the invention.

An interior projecting stop 53 is also provided at the rear end of the second crossbar 42 opposite the second groove 52. The provision of the stop 53 aims at preventing the open end 41 of the first crossbar 11 from further inserting through the second crossbar 42. In other words, the open end 41 is about flush with the rear end of the second crossbar 42. Also, the front and rear wheels 15 and 25 are properly disposed on the ground at this position.

Figure 6:
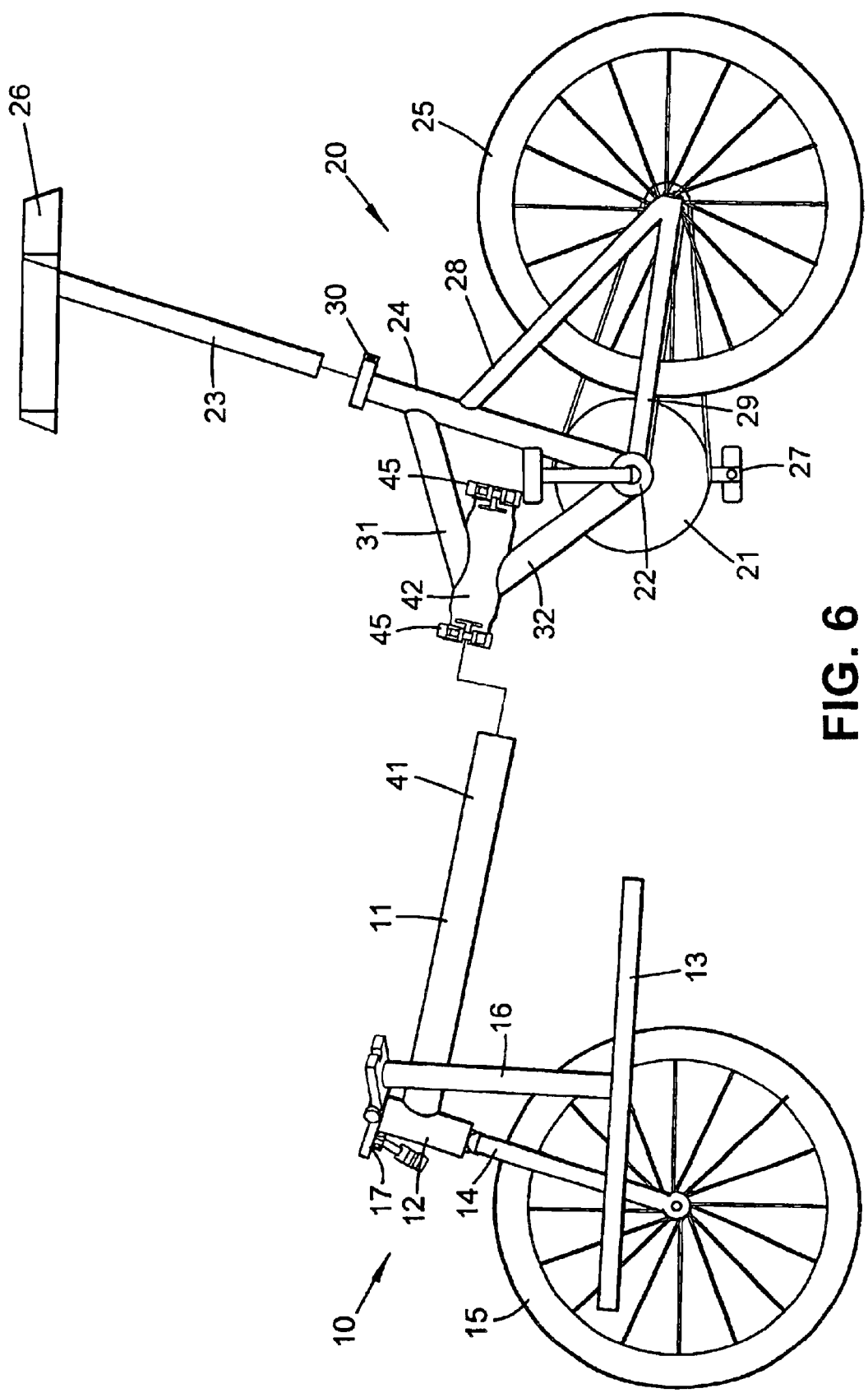
FIG. 6 is a side view of the completely detached bicycle.
Figure 7:
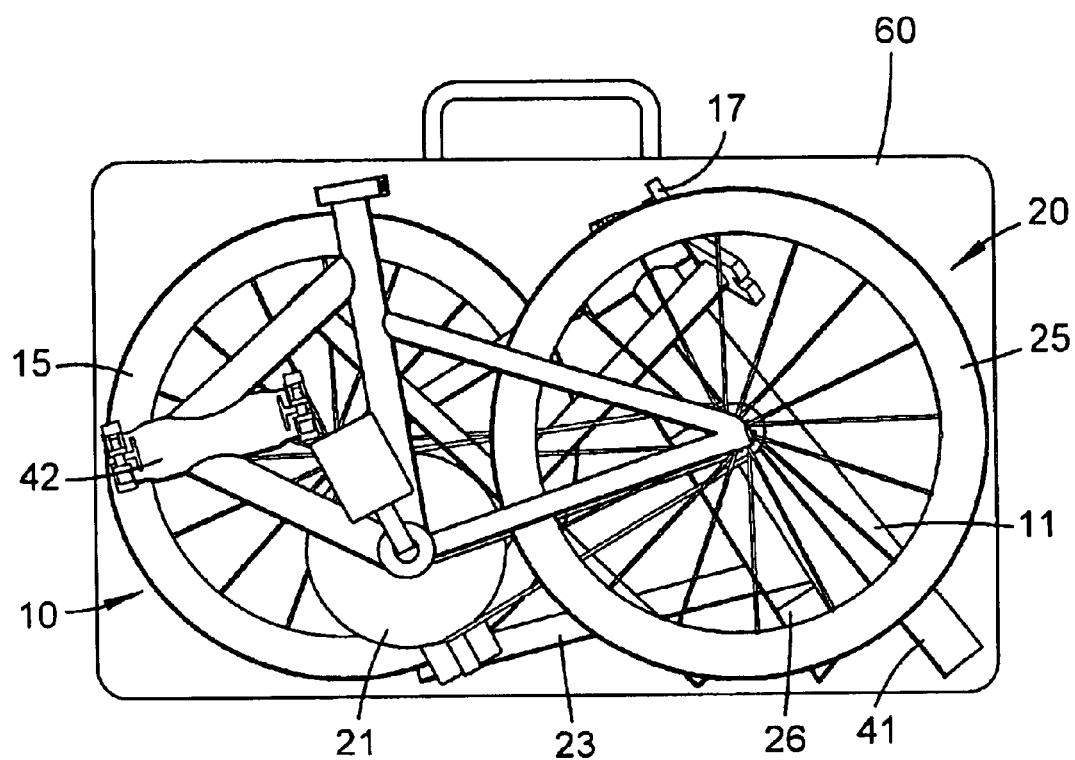
FIG. 7 is a side view of the detached bicycle stored in a luggage.

Referring to FIGS. 6 and 7, a disassembly of the bicycle will now be described in detail below. First, unfasten the quick release 30 so as to detach the seat post 23 from the seat tube 24. Next, unfasten the ring fasteners 45 to remove the open end 41 from the second crossbar 42 for detaching the front frame section 10 from the rear frame section 20. Next, unfasten the hinge 17 to fold down the handle tube 16 in order to reduce the height of the bicycle. Finally, tightly pack the front frame section 10, the rear frame section 20, and the seat tube 23 in a luggage 60. The luggage 60 is therefore adapted to store, for example, the trunk of a car while going for an outing.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A detachable bicycle, comprising:

a front frame section including a head tube, a fork, handlebars, a handle tube interconnecting the handlebars and the head tube, a front wheel, and a first crossbar having a rear open end and first fastening means;

a rear frame section including a bottom bracket, a pair of pedals coupled to the bottom bracket, a sprocket wheel coupled to the bottom bracket, a rear wheel, a chain stay extended rearward from the bottom bracket to an axle of the rear wheel, and a seat tube extended upwardly the bottom bracket, a seat stay having a rear end coupled to the axle of the rear wheel, a seat post inserted into the seat tube, the seat post having a top saddle, a quick release at a top opening of the seat tube, the quick release being adapted to secure the seat post and the seat tube together, a second crossbar for receiving the open end of the first crossbar, the second crossbar having second fastening means for matingly coupling to the first fastening means when the open end of the first crossbar is inserted into the second crossbar, an oblique down tube interconnecting the second crossbar and the bottom bracket, and an oblique connecting tube interconnecting the second crossbar and the seat tube; and a fastening mechanism including a first ring fastener and a second ring fastener, wherein the ring fasteners are operative to fasten a front end and a rear end of the second crossbar on the open end of the first crossbar.

2. The detachable bicycle of claim 1, wherein the first fastening means is a lengthwise first groove on the first crossbar and the second fastening means comprises two lengthwise second grooves on the front and rear ends of the second crossbar respectively.

3. The detachable bicycle of claim 1, wherein the second crossbar further comprises a front T-shaped gap end and a rear T-shaped gap so that the T-shaped gaps are operative to flexibly deform in fastening.

4. The detachable bicycle of claim 1, wherein the second crossbar further comprises an enlarged intermediate portion.

5. The detachable bicycle of claim 2, wherein the second crossbar further comprises an interior, rear projecting stop opposite one of the second grooves for preventing the open end of the first crossbar from further inserting through the second crossbar.

6. The detachable bicycle of claim 1, wherein the front frame section further comprises a hinge at a joining portion of the head tube and the handle tube so that the handle tube is operative to fold downward from the hinge.

* * * * *